3,574,153
WATER REMOISTENABLE HOT MELT ADHESIVE COMPOSITIONS COMPRISING MIXTURES OF WATER SOLUBLE POLYMERS WITH ACID HYDROLYZED POLYVINYL ACETATE
Julius Sirota, South Plainfield, N.J., assignor to National Starch and Chemical Corporation, New York, N.Y.
Filed July 6, 1967, Ser. No. 651,438
Int. Cl. C08f 29/30; C08g 49/00; C09j 3/06, 3/16
U.S. Cl. 260—8                                    10 Claims

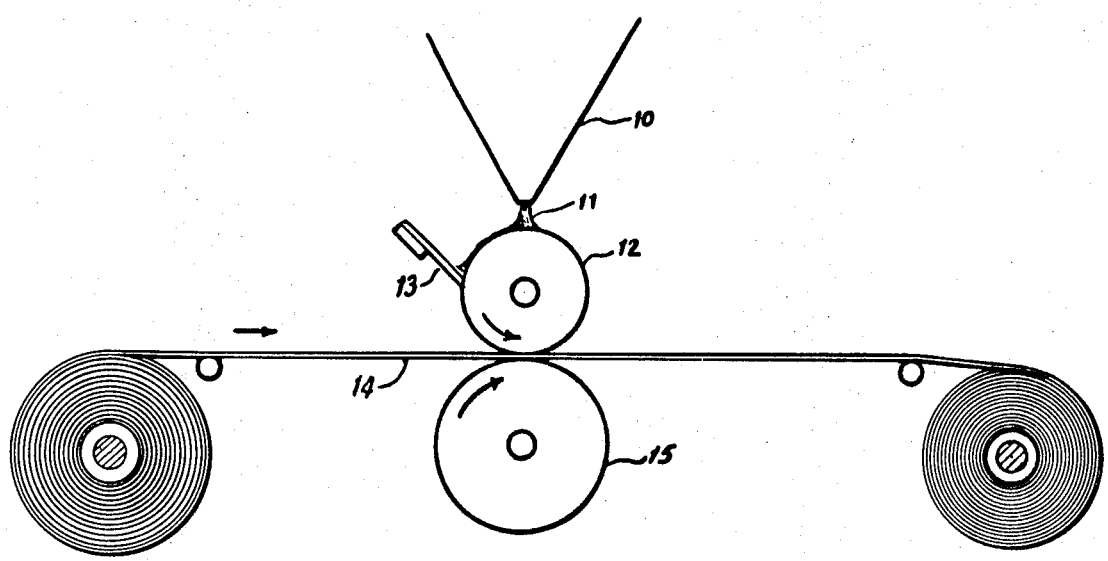

ABSTRACT OF THE DISCLOSURE

Remoistenable hot melt adhesive compositions comprising a mixture of a water soluble polymeric species with a polyvinyl acetate which has been hydrolyzed by means of an acidic hydrolysis technique to the extent that from about 10 to 60% of its original number of acetate groups are converted into hydroxyl groups. Flexible web substrates coated on at least one surface, or part thereof, with said remoistenable hot melt adhesive compositions. These adhesive compositions are ideally suited for use in the manufacture of envelopes, stamps, gummed tapes and wallpaper, etc.

BACKGROUND OF THE INVENTION

So-called remoistenable adhesives are commonly utilized in the production of tapes, labels, wallpaper, posters, envelopes, and similar products. On being moistened with water, substrates which have been coated with such adhesives will become tacky and thereby allow for their ready adhesion to a variety of other materials. In the manufacture of remoistenable adhesive products, it is the usual practice to prepare either an aqueous solution, i.e. a dispersion, or an organic solvent solution, i.e., a lacquer, of the dry adhesive material. After applying a wet film of the adhesive solution or dispersion to a paper substrate, the water or organic solvent is removed and the resulting dry, continuous adhesive film will, on being moistened, produce the desired tacky, adhesive surface.

There are, however, many disadvantages inherent in the use of such aqueous or organic solvent systems for the deposition of remoistenable adhesive films. Thus, the application of aqueous adhesive systems results in the swelling of the paper fibers and the eventual curling of the substrate. The occurrence of curling is further aggravated upon drying the coated substrate in order to remove the water therefrom. The resulting curled substrates must, therefore, be passed over knife edges in order to destroy the continuity of the adhesive film and thereby allow the substrate to resume its flat configuration. "Blocking" is still another undesirable phenomenon which results from the use of aqueous adhesive systems. Thus, when the adhesive coated substrates are stored and thereby exposed to varying degrees of humidity, the adjacent surfaces of the stacked substrates will often tend to adhere to one another.

Although the use of non-aqueous, organic solvent-based adhesives does not lead to the preparation of coated substrates which are prone to either curling or blocking, there are many hazards inherent in their use. Thus, explosion-proof equipment must be employed and other precautions are required for their safe handling and application. For example, ventilation to eliminate toxic hazards must be provided in order to protect against exposure to the solvent vapors which are encountered when such solvent-based adhesives are applied and subsequently dried.

In an attempt to overcome the deficiencies inherent in the remoistenable adhesive of the prior art, practitioners have resorted to the use of hot melt adhesive systems; the latter being solid, non-volatile compositions which are applied in the molten state and which achieve a solid state and resultant strength upon cooling. Thus, the curling and blocking which result from the use of aqueous systems as well as the toxicity and handling problems which attend the use of non-aqueous systems are eliminated by the use of such hot melt adhesives.

Such prior art remoistenable hot melt adhesives have included products which consisted solely of partially hydrolyzed polyvinyl acetates; the latter hydrolyzed polymers having been prepared by means of conventional alkaline hydrolysis techniques whereby the polyvinyl acetate is hydrolyzed in the presence of such alkaline catalysts as sodium hydroxide and sodium alkoxide compounds. Unfortunately, hot melt adhesive formulations based solely upon the latter alkaline hydrolyzed polyvinyl acetates are often difficult to melt, i.e. they require the application of high temperatures in order to effect their melting, the latter high temperatures thereby producing foamy, heat unstable, high-melt-viscosity liquids. Moreover, when excessively high concentrations of low melting plasticizing agents have been added to such alkaline hydrolyzed polyvinyl acetate hot melt formulations in order to cure the latter deficiency, a marked deterioration in their remoistening and paper tear characteristics has been noted.

I have previously discovered that satisfactory remoistenable hot melt adhesives can be prepared which consist essentially of polyvinyl acetate which has been acid hydrolyzed to the extent that from about 50 to 85% of its original number of acetate groups have been converted into hydroxyl groups; the latter adhesives being described in my copending application Ser. No. 620,709, filed Mar. 6, 1967 and now abandoned, and assigned to the assignee of the subject application. Although the latter products exhibit improved viscosity, stability, adhesive and remoistening characteristics, they are not, however, able to take advantage of the extraordinary stability and viscosity characteristics inherent in polyvinyl acetates which have been hydrolyzed to lower levels since products containing polyvinyl acetates which have been hydrolyzed to such low levels exhibit unacceptable remoistening characteristics.

SUMMARY OF THE INVENTION

It is the prime object of this invention to prepare remoistenable hot melt adhesive compositions which are suitable for application to flexible web substrates and which are devoid of the deficiencies inherent in prior art remoistenable adhesive systems.

Thus, it is the object of this invention to provide remoistenable hot melt adhesives characterized by their rapid remoistening, low melt viscosity, good heat and color stability, good block resistance and ease of application.

It is a further object to extend the range of partially hydrolyzed polyvinyl acetates which are applicable for use in remoistenable hot melt adhesives. Various other objects and advantages of this invention will become apparent to the practitioner from the following detailed description thereof.

I have now discovered that by preparing remoistenable hot melt adhesives comprising a blend of a partially hydrolyzed polyvinyl acetate and a water soluble polymeric species, each of the latter components being more fully described hereinbelow, I have succeeded in eliminating all of the problems heretofore encountered in the use of aqueous, organic solvent, and hot melt-based remoistenable adhesive systems including curling, blocking, poor heat stability and high melt viscosity. Thus, the specified adhesive compositions of this invention have been found to exhibit low melt viscosities, excellent heat stability, good block resistance, rapid bond strength, and excellent storage stability. When coated onto a suitable substrate and cooled, they yield continuous, consolidated adhesive films which may be moistened with water to form an adhesive surface capable of being securely bonded to other surfaces upon the application of manual pressure. Furthermore, they are readily adaptable to the conventional equipment utilized for the application of hot melt adhesive systems.

DESCRIPTION OF THE PREFERRED EMBODIMENT

The partially hydrolyzed polyvinyl acetates applicable for use in the adhesives of this invention are limited with regard to the molecular weight of the polyvinyl acetate bases utilized in their preparation as well as by the percentage of acetate ester groups which have been hydrolyzed to hydroxyl groups. Thus, expressing molecular weight in terms of intrinsic viscosity, the intrinsic viscosity, as determined in acetone at 30° C., of the applicable polyvinyl acetates should range from about 0.08 to 0.20, although the use of lower molecular weight polymers, i.e. those whose I.V. ranges from about 0.08 to 0.15, is preferred. The use, in the preparation of the hydrolyzed polyvinyl acetates applicable as the adhesive bases of this invention, of polyvinyl acetates exhibiting intrinsic viscosities in excess of about 0.20 is undesirable since they tend to produce compositions which are highly viscous and difficult to machine. On the other hand, the use of polyvinyl acetates exhibiting intrinsic viscosities falling below about 0.08 is also undesirable since they lead to the preparation of products which are exceedingly soft and hygroscopic and which tend to block and exhibit poor adhesive strength.

It should be noted that it may also be possible to utilize hydrolyzed copolymers of vinyl acetate in the preparation of the adhesives of this invention. Thus, for example, one may employ hydrolyzed copolymers of vinyl acetate with such monomers as the $C_1$–$C_4$ alkyl esters of acrylic and methacrylic acids it being essential, however, that the resulting copolymers are not substantially plasticized as a result of the presence of the latter comonomers so as to thereby increase the blocking tendencies of the resulting adhesives.

For the purposes of this invention, it is necessary to utilize partially hydrolyzed polyvinyl acetate which has been prepared by means of hydrolysis in the presence of acidic catalysts such as p-toluenesulfonic acid, benzenesulfonic acid, phenolsulfonic acid, xylenesulfonic acid, hydrochloric acid, sulfuric acid, nitric acid and phosphoric acid. Such procedures generally involve refluxing an aqueous dispersion of the polyvinyl acetate in the presence of an acidic catalyst, neutralizing the acidic catalyst present in the system by the addition of stoichiometric quantities of alkaline reagent, steam distilling to remove the water, and thereafter heating the resulting product to dryness. It should be noted that the percent hydrolysis can be readily controlled by simply altering one or more of the process variables utilized in the hydrolysis procedure such, for example, as the reaction time, the concentration of catalyst, or the concentration of water, etc. Only those hydrolyzed polyvinyl acetates resulting from the latter acid hydrolysis procedure are applicable for use as the adhesive bases of this invention inasmuch as they are found to exhibit lighter color, lower melt viscosities, greater heat stability, foam-free melts, and more rapid remoistening properties than those partially hydrolyzed polyvinyl acetates which have been prepared by means of alkaline hydrolysis techniques.

In order to be effectively utilized in the remoistenable hot melts of this invention, the applicable polyvinyl acetates should be hydrolyzed to the extent that from about 10 to 60% of their original number of acetate groups are converted into hydroxyl groups. Those polymers which have been hydrolyzed to a greater degree, i.e. where more than 60% of the acetate groups have been hydrolyzed, are unsuitable inasmuch as they cause the adhesive product to become excessively tacky upon being remoistened with water thereby resulting in coatings having slow drying speeds, stringy glue lines and poor adhesion characteristics. On the other hand, adhesive systems containing polymers which have been hydrolyzed to a lesser degree, i.e. where less than 10% of their acetate groups have been hydrolyzed, do not exhibit sufficient remoistening ability.

The second essential component of the novel remoistenable hot melts of this invention is the above noted water soluble polymeric species. These required polymers, which exhibit relatively high molecular weights, may be either natural or synthetic products and they may be either unmodified or modified by subsequent chemical treatments. They should be completely soluble in at least an equal weight of water. In addition, these polymers should not melt to an appreciable extent when subjected to the high temperatures, i.e. about 250 to 400° F., that are utilized in order to place the hot melt adhesive composition in molten form. Among the applicable water soluble polymers are included: dextrines, starch conversion products; proteins such as animal glue; cellulosics such as hydroxyethyl cellulose, methyl cellulose and carboxymethyl cellulose; synthetic water soluble polymers and salts thereof such as poly(vinyl methyl ether/maleic anhydride), the ammonium salt of a styrene-maleic anhydride copolymer, polyvinyl pyrrolidone, polyacrylic acid and ethylenemaleic anhydride copolymers; and, water soluble gums such as gum arabic, gum tragacanth and gum agar. It is to be noted, however, that dextrines and starch conversion products are preferred for use in the novel products of this invention. With regard to the latter preferred classes of water soluble polymers, British, white and canary dextrines are all applicable for use in the products of this invention; the methods employed for the preparation of these various dextrin types being well known to those skilled in the art and include treatment of raw starch with either heat and/or acid and/or enzymes or any other means desired by the practitioner. The applicable starch conversion products may be derived from a variety of plant sources such as corn, potato, tapioca and waxy maize and include: oxidized starches prepared by treatment with oxidants such as sodium hypochlorite; and, fluidity or thin boiling starches prepared by enzyme conversion or by mild acid hydrolysis, etc.

The actual preparation of my novel adhesives may be readily accomplished by merely admixing the partially hydrolyzed polyvinyl acetate with the water soluble polymeric species together with any optional ingredients whose presence may be desired; the admixture of the latter ingredients being conducted under agitation and at a temperature ranging from about 250° to 375° F. The resulting mixture should then be thoroughly agitated so as to achieve a uniform consistency therein.

With regard to proportions, the water soluble polymeric species should be present in the adhesive composition in a concentration ranging from about 5 to 70% of the weight of the total solids in the mixture, i.e. the partially hydrolyzed polyvinyl acetate, water soluble polymeric species and any optional additives which are present in the system. Those adhesive systems which contain more than about 70%, by weight, of the latter component are unsuitable inasmuch as they tend to be excessively viscous, while systems which contain less than about 5%, by weight, of this water soluble polymeric species do not exhibit sufficient remoistening ability.

Various optional additives may be added to the novel remoistening hot melts of this invention in order to modify certain characteristics thereof. Thus, for example, it may be possible to improve their remoistening ability, increase their setting speed, lower their melt viscosity, increase their thermal stability and increase their block resistance by the use of various additives including: fillers, such as clay and chalk; non-volatile platicizers, such as polyethylene glycols, tetrahydrofurfuryl alcohol, dibutyl phthalate, polyoxyethylene aryl ether and butyl phthalyl butyl glycolate; anti-oxidants, such as butylated hydroxyanisole, butylated hydroxytoluene and sodium benzoate; lubricants; waxes; pigments; dyes; and, flavoring agents. Since the addition of excessive concentrations of plasticizer is detrimental to the remoistening properties of the resulting hot melt compositions, it is advisable to maintain the plasticizer concentration below a level of about 15%, as based on the weight of hydrolyzed polyvinyl acetate.

A variety of methods may be used in order to prepare the remoistenable hot melt compositions of this invention so that they may, thereafter, be applied to the surface of the desired substrate. Thus, the ingredients may merely be combined with one another in a heated pot in the order of their respective melting points. Or, they may be prepared in solution form with the solvents being removed prior to their application. Calendering rolls and extruders may also be used, it being essential in all of these methods that the ingredients are thoroughly blended and available for rapid transfer to the intended substrate. In most instances, the resulting remoistenable hot melt adhesive compositions are applied to the selected substrate at temperatures ranging from about 250 to 400° F.; the melt viscosities at these temperatures ranging from about 3000 to 40,000 cps. Although paper is the usual flexible web substrate to which these adhesives will be applied, paperboard, synthetic polymeric films and textiles may also be efficiently utilized.

Any of the conventional hot melt coating methods can be utilized to deposite the adhesive compositions of this invention. Examples of available techniques include knife coating, roller coating, spraying and dipping, etc. The coating thickness at which these adhesives are applied will, of course, vary according to the particular adhesive formulation, although practical coating thicknesses range from about 0.5 to 2.0 mils. Upon cooling, the molten adhesive will set to a solid state. The resulting continuous dry films are characterized by their smoothness and lack of tackiness and, upon the application of water, by their quick remoistenability, tackiness and excellent bonding strength.

In the drawing I have illustrated diagrammatically the application of the material by means of rollers, wherein 10 is a pot of molten hot melt composition 11, flowed onto roller 12, controlled by doctor blade 13 and applied to substrate 14 which is pulled over pressure roll 15.

In the following examples, which further illustrate the embodiment of this invention, all parts given are by weight unless otherwise specified.

EXAMPLE I

This example illustrates the preparation of a typical remoistenable hot melt adhesive composition of this invention as well as its unique adhesive properties. It further illustrates a typical acid hydrolysis procedure for preparing the partially hydrolyzed polyvinyl acetate utilized therein.

Thus, in preparing the partially hydrolyzed polyvinyl acetate, the following ingredients were introduced into a vessel equipped with means for mechanical agitation.

|  | Parts |
|---|---|
| Polyvinyl acetate (I.V. of 0.11, as determined in acetone at 30° C.) | 5280 |
| Water | 480 |
| p-Toluenesulfonic acid | 9.6 |

Under agitation, the above ingredients were refluxed at a temperature of 212° F. for a period of 3.5 hours at which time a clear solution resulted. The later solution was then refluxed for an additional 1.5 hours. The catalyst was neutralized by the addition of 2.2 parts of sodium hydroxide and the resulting product was then steam distilled for about 12 hours while the internal temperature of the system was raised to 250° F. This distillation procedure removed the water and free acetic acid present in the system. On subsequently raising the temperature to 315° F. for a period of 15 minutes, it was possible to draw off the partially hydrolyzed polyvinyl acetate in molten form.

On analyzing a sample of the resulting product, it was determined that 25% of the acetate groups in the polyvinyl acetate had been hydrolyzed to hydroxyl groups and that the product had a melt viscosity, at 350° F., of 2000 centipoises.

Thereafter, 65 parts of the above prepared partially hydrolyzed polyvinyl acetate were admixed with 30 parts of a British corn dextrin and 5 parts of dibutyl phthalate; the resulting mixture being heated at a temperature of 350° F. for a period of 2 hours, i.e. the time required for the preparation of a uniform blend.

The resulting molten composition was maintained at a temperature of 350° F. and thereafter coated, in a one mil thickness, on envelope paper stock by means of a heated rod technique; a technique whereby coating rods which are at a temperature of about 350° F. are utilized to apply the molten adhesive composition. The coated sample was then aged for a period of 48 hours at a relative humidity of 70%. Neither curling nor blocking was observed in the aged sample. Furthermore, it remoistened rapidly and exhibited excellent adhesive bonding.

EXAMPLE II

This example illustrates the necessity for requiring the presence of a water soluble polymeric species in my novel adhesives as well as the advisability of utilizing partially hydrolyzed polyvinyl acetates which have been hydrolyzed to the extent of from about 10 to 60% of their available acetate groups.

Utilizing the general procedure set forth in Example I, hereinabove, partially hydrolyzed polyvinyl acetates were prepared exhibiting varying degrees of hydrolysis. Thereafter, 70 parts of each of the thus prepared partially hydrolyzed polyvinyl acetates were blended, at a temperature of 350° F., with 30 parts of British gum dextrin. The resulting molten adhesive compositions as well as a sample of 100 parts of each of the partially hydrolyzed polyvinyl acetates utilized therein were then subjected to the following remoistenability determination:

A series of films having a wet thickness of 1.0 mil were cast on envelope paper stock from the partially hydrolyzed polyvinyl acetate samples which had been heated at a temperature of 350° F. in order to put them in molten form. The dry films were then remoistened with water and adhered, by means of manual pressure, to uncoated paper stock. After a period of 30 seconds, the resulting bonded substrates were delaminated and examined for the purpose of determining the degree of fiber tear relative to the total area of the adhesive coating, the result then being expressed as "percent tear."

| Percent hydrolysis of polyvinyl acetate | Remoistenability | |
|---|---|---|
| | Without dextrin | With dextrin |
| | percent | |
| 7 | 0 | 0 |
| 10 | 0 | 50 |
| 17 | 0 | 100 |
| 37 | 0 | 100 |
| 54 | 0 | 100 |
| 59 | 50 | 100 |
| 62 | 100 | [1] 0 |

[1] Slow drying time and stringly glue line.

The data summarized above thus serve to illustrate the necessity for requiring the presence of a water soluble polymeric species in my novel adhesive systems as well as the necessity for utilizing polyvinyl acetates which have been partially hydrolyzed to the extent of from about 10 to 60% of their original number of acetate groups. Thus, those adhesives which did not contain such water soluble polymeric species and/or did not contain polyvinyl acetates which had been appropriately hydrolyzed, were seen to exhibit poor remoistening and adhesive characteristics.

EXAMPLE III

This example illustrates the necessity for utilizing polyvinyl acetates which have been partially hydrolyzed by means of an acidic hydrolysis procedure in order to prepare satisfactory remoistenable hot melt adhesive compositions.

Thus, 100 gram samples of (1) a 42% acid hydrolyzed polyvinyl acetate which had been prepared by means of the procedure set forth in Example I, hereinabove; (2) a 42% alkaline hydrolyzed polyvinyl acetate which had been prepared by means of an alcoholysis technique utilizing a methanol solvent and a sodium hydroxide catalyst; and, (3) a commercially available 38–46% hydrolyzed polyvinyl acetate which had been prepared by means of an alkaline hydrolysis procedure, were each, respectively, subjected to the following "Heat Stability" determination.

A 50 gram sample of each of the above described partially hydrolyzed polyvinyl acetates was heated in an oil bath at a temperature of 350° F. The resulting molten samples were then placed in an oven set at a temperature of 350° F. and retained therein for a period of 24 hours. Observations were then made as to changes in appearance in order to determine the extent of degradation exhibited by the hot melt.

| Sample No. | Initial appearance of hot melt | Heat stability |
|---|---|---|
| 1 | Clear, smooth, light-yellow fluid | Clear, smooth, light-yellow fluid. |
| 2 | Foamy brown fluid | Slightly foamed, darkened mass. |
| 3 | Foamy tan fluid | Slightly foamed, darkened mass. |

The data summarized above clearly indicate the necessity for utilizing only acid hydrolyzed polyvinyl acetates in order to provide remoistenable hot melt adhesive compositions which are characterized by excellent heat stability.

EXAMPLE IV

This example further illustrates the excellent properties exhibited by a variety of remoistenable hot melt adhesive compositions typical of this invention.

The acid hydrolyzed polyvinyl acetates described in the following table were prepared by means of the procedure set forth in Example I, hereinabove. The various water soluble polymeric species and modifying agents were thereafter admixed with these polyvinyl acetates and maintained, under agitation, at a temperature of 350° F. for a period of two hours, i.e. the time required for the preparation of uniform blends.

The coated samples were then aged for a period of 48 hours at a relative humidity of 70%. Neither curling nor blocking was observed in any of the aged samples. Furthermore, all of the samples remoistened rapidly and exhibited tearing bonds within a period of 30 seconds upon being subjected to the "Remoistenability" determination described in Example II, hereinabove.

Summarizing, it is thus seen that this invention provides for the preparation of novel remoistening hot melt adhesive compositions which are characterized by their low melt viscosity, their heat stability, and their excellent remoistening and bonding properties.

What is claimed is:

1. A solid, water remoistenable hot melt adhesive composition comprising a solid blend of:
   (1) a water soluble polymeric species and
   (2) a polyvinyl acetate which has been hydrolyzed by means of an acid catalyzed hydrolysis procedure to the extent that from about 10 to 60% of its original number of acetate groups are converted into hydroxyl groups; said water soluble polymeric species being present in a concentration of from about 5 to 70%, based on the weight of total solids in said composition, being completely soluble in at least an equal weight of water and incapable of being melted to an appreciable extent at temperatures in the range of from about 250–400° F., and being selected from the group consisting of: (A) dextrines; (B) starch conversion products selected from the group consisting of oxidized and thin boiling starches; (C) animal glue; (D) cellulosics selected from the group consisting of hydroxyethyl cellulose, methyl cellulose and carboxymethyl cellulose; (E) water soluble gums selected from the group consisting of gum arabic, gum tragacanth and gum agar; and, (F) synthetic water soluble polymers selected from the group consisting of poly(vinyl methyl ether/maleic anhydride) copolymers, styrene-maleic anhydride copolymers, polyvinyl pyrrolidone, polyacrylic acid, ethylene-maleic anhydride copolymers and the salts of the latter polymers.

2. The adhesive composition of claim 1, wherein said partially hydrolyzed polyvinyl acetate has been derived from a polyvinyl acetate polymer having an intrinsic viscosity, as determined in acetone at 30° C., of from about 0.08 to 0.20.

3. The adhesive composition of claim 1, wherein said polyvinyl acetate has been partially hydrolyzed by means of an acid catalyzed hydrolysis procedure comprising the steps of: (1) heating an aqueous dispersion of said polyvinyl acetate polymer at the reflux temperature of said dispersion in the presence of an acidic catalyst; (2) neutralizing the acidic catalyst present therein by the addition

| Ingredients | Parts formulation number | | | | | | | |
|---|---|---|---|---|---|---|---|---|
| | 1 | 2 | 3 | 4 | 5 | 6 | 7 | 8 |
| A 10% acid hydrolyzed polyvinyl acetate | 45 | | | | | | | |
| A 17% acid hydrolyzed polyvinyl acetate | | 57 | | | | | | |
| A 34% acid hydrolyzed polyvinyl acetate | | | 68 | | | | | |
| A 40% acid hydrolyzed polyvinyl acetate | | | | 80 | | | | 89.5 |
| A 50% acid hydrolyzed polyvinyl acetate | | | | | 85 | | 89.5 | |
| A 59% acid hydrolyzed polyvinyl acetate | | | | | | 90 | | |
| British gum dextrin | | | 30 | 20 | 20 | 5 | | |
| A waxy maize starch which had been acid converted [1] | | 40 | | | | | | |
| A tapioca starch which had been oxidized [2] | 50 | | | | | | | |
| Animal glue | | | | | | | 10.0 | |
| A 1:1 copolymer of vinyl methyl ether and maleic anhydride | | | | | | | | 10.0 |
| Dibutyl phthalate | 5 | 3 | 2 | | | | | |
| Sodium benzoate | | | | | | | 0.5 | 0.5 |
| Glyceryl monosterate | | | | | 5 | 5 | | |

[1] To a degree known as 85 fluidity.
[2] By treatment with an aqueous sodium hypochlorite solution to a degree known as 75 fluidity.

Each of the above described molten formulations was heated to a temperature of 350° F. and thereafter coated, in one mil thicknesses, on envelope paper stock by means of a heated rod technique.

of stoichiometric quantities of an alkaline reagent; (3) steam distilling the neutralized solution and, (4) heating the resulting partially hydrolyzed polyvinyl acetate to dryness.

4. The adhesive composition of claim 1, which has a melt viscosity, at a temperature range of from about 250 to 400° F., of from about 3000 to 40,000 cps.

5. A method for preparing a solid, water remoistenable adhesive composition, said method comprising:
   (1) hydrolyzing a polyvinyl acetate polymer having an intrinsic viscosity, as determined in acetone at 30° C., of from about 0.08 to 0.20 by means of an acid catalyzed hydrolysis procedure comprising the steps of (a) heating an aqueous dispersion of said polyvinyl acetate at the reflux temperature of said dispersion in the presence of an acidic catalyst, (b) neutralizing the acidic catalyst present therein by the addition of stoichiometric quantities of an alkaline reagent, (c) steam distilling the neutralized solution, and (d) heating the resulting partially hydrolyzed polyvinyl acetate to dryness; said polyvinyl acetate having thereby been hydrolyzed to the extent that from about 10 to 60% of its original number of acetate groups are converted into hydroxyl groups; and
   (2) blending said partially hydrolyzed polyvinyl acetate with from about 5 to 70% of a water soluble polymeric species; the latter concentration being based on the weight of total solids in said composition; said water soluble polymeric species being completely soluble in at least an equal weight of water and incapable of being melted to an appreciable extent at temperatures in the range of from about 250–400° F., and being selected from the group consisting of: (A) dextrines; (B) starch conversion products selected from the group consisting of oxidized and thin boiling starches; (C) animal glue; (D) cellulosics selected from the group consisting of hydroxyethyl cellulose, methyl cellulose and carboxymethyl cellulose; (E) water soluble gums selected from the group consisting of gum arabic, gum tragacanth and gum agar; and, (F) synthetic water soluble polymers selected from the group consisting of poly (vinyl methyl ether/maleic anhydride) copolymers, styrene-maleic anhydride copolymers, polyvinyl pyrrolidone, polyacrylic acid, ethylene-maleic anhydride copolymers and the salts of the latter polymers.

6. A water remoistenable adhesive coated substrate comprising a flexible web coated on at least a portion of one surface thereof with an adhesive film comprising the dry residue of a solid, water remoistenable hot melt composition, said water remoistenable hot melt composition comprising a solid blend of:
   (1) a water soluble polymeric species, and
   (2) a polyvinyl acetate which has been hydrolyzed by means of an acid catalyzed hydrolysis procedure to the extent that from about 10 to 60% of its original number of acetate groups are converted into hydroxyl groups: said water soluble polymeric species being present in a concentration of from about 5 to 70%, based on the weight of total solids in said composition, being completely soluble in at least an equal weight of water and incapable of being melted to an appreciable extent at temperatures in the range of from about 250–400° F., and being selected from the group consisting of: (A) dextrines; (B) starch conversion products selected from the group consisting of oxidized and thin boiling starches; (C) animal glue; (D) cellulosics selected from the group consisting of hydroxyethyl cellulose, methyl cellulose and carboxymethyl cellulose; (E) water soluble gums selected from the group consisting of gum arabic, gum tragacanth and gum agar; and, (F) synthetic water soluble polymers selected from the group consisting of poly (vinyl methyl ether/maleic anhydride) copolymers, styrene-maleic anhydride copolymers, polyvinyl pyrrolidone, polyacrylic acid, ethylene-maleic anhydride copolymers and the salts of the latter polymers.

7. The adhesive coated substrate of claim 6, wherein said partially hydrolyzed polyvinyl acetate has been derived from a polyvinyl acetate polymer having an intrinsic viscosity, as determined in acetone at 30° C., of from about 0.08 to 0.20.

8. The adhesive coated substrate of claim 6, wherein said polyvinyl acetate has been partially hydrolyzed by means of an acid catalyzed hydrolysis procedure comprising the steps of: (1) heating an aqueous dispersion of said polyvinyl acetate at the reflux temperature of said dispersion in the presence of an acidic catalyst; (2) neutralizing the acidic catalyst present therein by the addition of stoichiometric quantities of an alkaline reagent; (3) steam distilling the neutralized solution; and, (4) heating the resulting partially hydrolyzed polyvinyl acetate to dryness.

9. The adhesive coated subtrate of claim 6, wherein said water remoistenable hot melt composition has a melt viscosity, at a temperature range of from about 250 to 400° F., of from about 3000 to 40,000 cps.

10. A method for preparing a water remoistenable adhesive coated substrate, said method comprising:
    (1) hydrolyzing a polyvinyl acetate polymer having an intrinsic viscosity, as determined in acetone at 30° C., of from about 0.08 to 0.20 by means of an acid catalyzed hydrolysis procedure comprising the steps of (a) heating an aqueous dispersion of said polyvinyl acetate at the reflux temperature of said dispersion in the presence of an acidic catalyst, (b) neutralizing the acidic catalyst present therein by the addition of stoichiometric quantities of an alkaline reagent, (c) steam distilling the neutralized solution, and (d) heating the resulting partially hydrolyzed polyvinyl acetate to dryness; said polyvinyl acetate having thereby been hydrolyzed to the extent that from about 10 to 60% of its original number of acetate groups are converted into hydroxyl groups;
    (2) blending said partially hydrolyzed polyvinyl acetate with from about 5 to 70% of a water soluble polymeric species, the latter concentration being based on the weight of total solids in said composition; (3) melting the resulting solid blend at a temperature range of from about 250 to 400° F.; (4) coating said molten blend on at least a portion of one surface of a flexible web substrate; and (5) cooling so as to obtain a dry, tack-free adhesive film; said water soluble polymeric species being completely soluble in at least an equal weight of water and incapable of being melted to an appreciable extent at temperatures in the range of from about 250–400° F. and being selected from the group consisting of: (A) dextrines; (B) starch conversion products selected from the group consisting of oxidized and thin boiling starches; (C) animal glue; (D) cellulosics selected from the group consisting of hydroxyethyl cellulose, methyl cellulose and carboxymethyl cellulose; (E) water soluble gums selected from the group consisting of gum arabic, gum tragacanth and gum agar; and (F) synthetic water soluble polymers selected from the group consisting of poly (vinyl methyl ether/maleic anhydride) copolymers, styrene-maleic anhydride copolymers, polyvniyl pyrrolidone, polyacrylic acid, ethylene-maleic anhydride copolymers and the salts of the latter polymers.

References Cited

UNITED STATES PATENTS

| | | | |
|---|---|---|---|
| 2,271,724 | 2/1942 | Traylor | 117—122 Hot Melt Dig. |
| 2,398,042 | 4/1946 | Salo | 117—122 Hot Melt Dig. |
| 2,458,428 | 1/1949 | Salo | 117—122 Hot Melt Dig. |
| 2,804,395 | 8/1957 | Boyajian | 117—122S |
| 2,808,381 | 10/1957 | Stone | 117—122S |

(Other references on following page)

UNITED STATES PATENTS

| | | | |
|---|---|---|---|
| 3,296,018 | 1/1967 | Sullivan et al. | 117—122H |
| 2,310,292 | 2/1943 | Humphner | 117—76 |
| 2,135,075 | 11/1938 | Hermann | 49—81 |
| 2,341,398 | 2/1944 | Strother | 260—87 |
| 2,424,110 | 7/1947 | Morrison et al. | 117—161UHC |
| 2,850,468 | 9/1958 | Giggey | 260—29.6 |
| 2,998,400 | 9/1961 | French | 260—8 |
| 3,011,985 | 12/1961 | Breslouf et al. | 260—8 |
| 3,126,355 | 3/1964 | Birten et al. | 260—8 |
| 3,200,094 | 8/1965 | Sederlund et al. | 260—8 |
| 3,303,147 | 2/1967 | Elden | 260—8 |
| 3,355,322 | 11/1967 | Worrall et al. | 260—17.4ST |
| 2,037,012 | 4/1936 | Dreyfus | 260—89.1 |
| 3,462,342 | 8/1969 | Cooper et al. | 260—895 |

FOREIGN PATENTS

| | | | |
|---|---|---|---|
| 494,929 | 11/1938 | Great Britain | 117—122 |

WILLIAM H. SHORT, Primary Exmainer

E. WOODBERRY, Assistant Examiner

U.S. Cl. X.R.

117—156, 157, 161; 260—17, 17.4, 89.1, 895, 901